July 23, 1929.  J. C. GABRIEL  1,722,084
FREQUENCY INDICATING SYSTEM
Filed Dec. 4, 1924
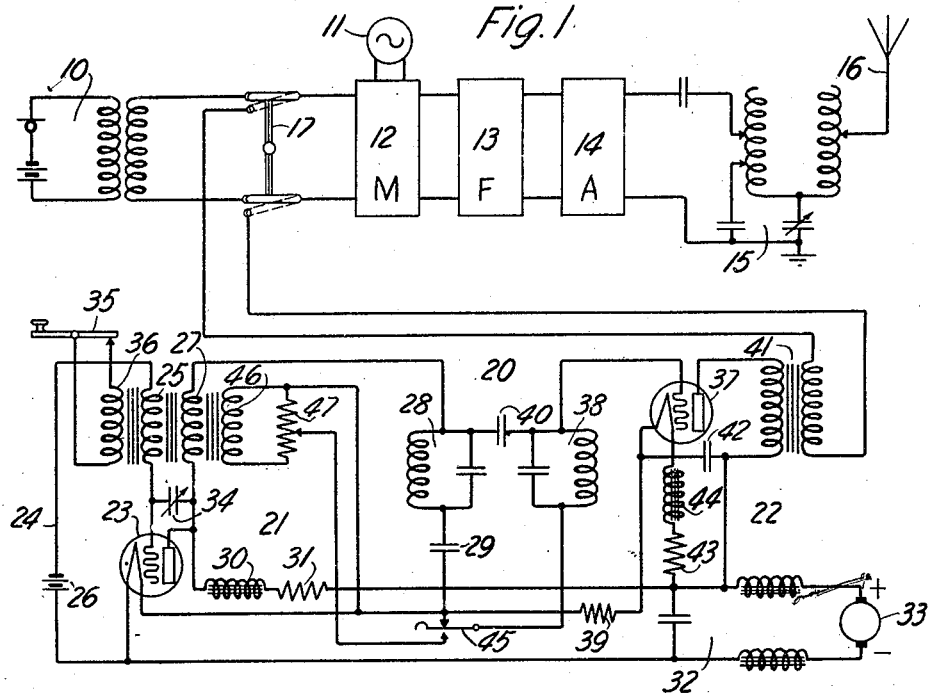
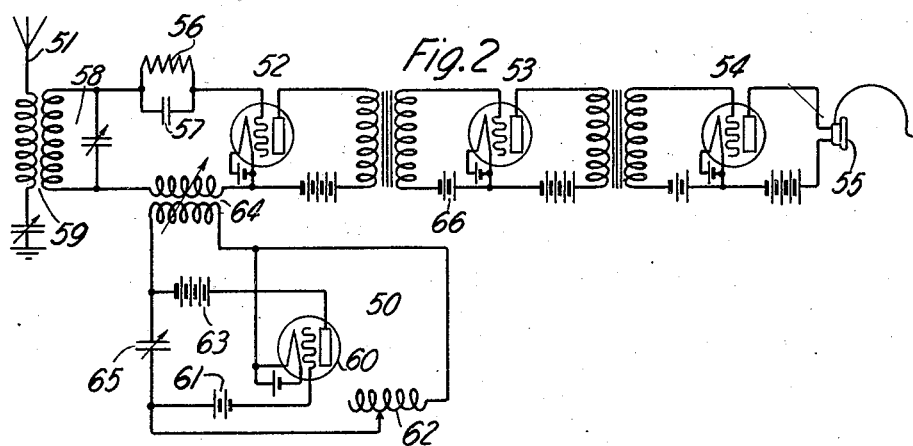
Inventor:
John C. Gabriel
by E. W. Adams Atty.

Patented July 23, 1929.

1,722,084

UNITED STATES PATENT OFFICE.

JOHN CECIL GABRIEL, OF NEW YORK, N. Y., ASSIGNOR TO WESTERN ELECTRIC COMPANY, INCORPORATED, OF NEW YORK, N. Y., A CORPORATION OF NEW YORK.

FREQUENCY-INDICATING SYSTEM.

Application filed December 4, 1924. Serial No. 753,815.

This invention relates to frequency indicating systems and more particularly to means for indicating the frequency of signal waves.

In signaling systems, utilizing carrier waves, it is customary to transmit carrier waves modulated by signal waves from a sending station to a receiving station and to supply waves of carrier frequency locally at the receiving station. A requirement of this method of signaling is that the generator at the receiving station which supplies reinforcing waves must be maintained, within relatively narrow limits of variation, at the frequency of the generator supplying carrier waves at the sending station. It is however, not usually necessary that the local oscillator, at the receiving station, should be maintained, at all times, exactly at the frequency of the oscillator at the transmitting station. It is, therefore, possible, in practice, to operate a system employing the ordinary type of oscillation generator with only periodic inspection and adjustment of its frequency. Especially is this true in systems wherein the unmodulated carrier frequency component of modulated waves and one side band are suppressed at the sending station and only a single side band is transmitted to the receiving station. By this invention, a means and method are provided whereby relatively unskilled persons may periodically observe and adjust the frequency of an oscillation generator supplying carrier waves in a signal receiving system, the departure of the frequency of the local oscillator from the desired frequency being identified by the rate of recurrence of a wave of predetermined frequency.

An object of the invention is to produce an indication of variation of electric waves from a desired frequency.

Another object is to combine waves of a plurality of frequencies as a means of indicating the variations in the frequency of an oscillation generator.

Another object of the invention is to indicate a departure from a desired value in the frequency of the waves employed in an electric signaling system by combining therewith waves of a plurality of different frequencies to produce a resulting wave having a frequency capable of operating an indicating device.

A further object is to enable periodic observation and correction of variations in the frequency of a source of carrier waves.

A feature of the invention relates to a method of testing the frequency of an oscillation generator which may be applied to a carrier wave signaling system without substantial change from the normal operating condition of the system.

Another feature of the invention relates to a testing system which includes means for generating two harmonically related waves arranged to be readily substituted for a source of signal waves in the circuit of a radio transmitting station.

This invention comprises broadly a method of indicating variations in the frequency of a source of continuous waves and also a method for indicating when a source of waves is adjusted to produce waves of a given or desired frequency. The invention is capable of general application to testing systems, but is herein described in connection with a signaling system, particularly a carrier wave system, where a local oscillator, at the transmitting station, supplies carrier waves to be modulated and a local oscillator, at the receiving station, also supplies carrier waves for reinforcing the received modulated waves. In order to test the frequency of the local oscillator at the receiving station, the carrier wave at the transmitting station is modulated by waves of two frequencies, one, for example, having a frequency twice that of the other. One side band of the modulated wave, either with or without its associated side band and unmodulated carrier component, is received at the receiving station and combined with waves of the carrier frequency, supplied by the local oscillator at this station, to obtain therefrom waves of the modulating frequencies. These waves are then translated by a distorting device and an undistorted component of the waves together with waves resulting from distortion are supplied to a signal indicator. For optimum reception, the locally supplied carrier waves should be of the same frequency as the carrier waves which were suppressed at the transmitting station. However, if the locally supplied carrier waves have a frequency different from that of the carrier waves suppressed at the transmitting station, the waves resulting from detection will include two waves having frequencies corresponding to those of the respective modulating waves plus the difference between the frequency of waves from the two carrier sources. Upon applying these two waves to the distorting device, the one of lower frequency will produce a harmonic of double its frequency. The harmonic upon combining with the other of the two waves just mentioned, will produce a beat wave of frequency equal to the difference in frequency of the two carrier sources. This beat wave operates the signal indicating device as notification to an observer that the frequency of the local oscillator requires adjustment. When proper adjustment of the frequency of the local oscillator is made, the beat frequency disappears and the condition of the indicating device is notice to the observer that the frequency of the local oscillator is correct.

The invention is described more in detail in the portion of the specification which follows with reference to the drawings in which:

Fig. 1 illustrates a radio transmitting station arranged to transmit to a receiving station waves so modulated as to permit the indication and adjustment of the frequency of waves generated at the receiving station.

Fig. 2 illustrates a radio receiving station designed to cooperate with the transmitting station of Fig. 1 whereby the frequency of its local oscillator may be observed and adjusted.

The transmitting station illustrated in Fig. 1 comprises a source of signal waves 10 and a source of carrier waves 11 arranged to be supplied to a modulator 12. Modulated carrier waves from the modulator 12 are filtered by filter 13 which may be designed to pass only one side band, and this is supplied through amplifier 14 and resonant circuit 15 to antenna 16 from which it is radiated. By means of a switch 17, the source of signal waves 10 may be disconnected from the modulator 12 and a harmonic generating system 20 substituted therefor. The harmonic generator includes an oscillator 21 and an amplifier 22. The oscillator 21 includes a space discharge tube 23 with an input circuit 24 including transformer winding 25 and polarizing battery 26 connected to its control electrode and cathode. The battery 26 preferably supplies a voltage such that the tube 23 operates on a portion of its characteristic curve at which distortion of translated waves takes place. An output circuit for tube 23 includes transformer winding 27, resonant circuit 28 and blocking condenser 29, connected to its anode and cathode. A space current circuit for tube 23 is connected to its anode and cathode and includes choke coil 30 in series with resistance 31, filter 32 and a source of space current 33, here represented as a direct current generator. Coupling between the output and input circuits of tube 23, whereby oscillations may be generated, is supplied by adjustable condenser 34 and by the magnetic linkage between transformer windings 25 and 27. The generation of oscillations by oscillator 21 is controlled by a circuit including key 35 connected to transformer winding 36.

The amplifier 22 includes space discharge tube 37. This tube has an input circuit connected to its control electrode and cathode which includes resonant circuit 38 and resistance 39. By operating switch key 45, transformer winding 46 in parallel with resistance 47 also may be included in this input circuit. The input circuit of tube 37 is coupled to the output circuit of tube 23 by a condenser 40. An output circuit for tube 37 includes its anode and cathode and the primary winding of transformer 41 in series with by-pass condenser 42. The space current circuit for the tube also includes the primary winding of transformer 41, filter 32, generator 33, resistance 43 and choke coil 44. The filter 32 and resistances 43 and 31, respectively, are provided to suppress variations in the potential of source 33.

The terminals of the secondary winding of transformer 41 are connected to contacts of switch 17, whereby waves from the harmonic generator are supplied to the modulator.

The polarizing potential for the control electrode of tube 37 is secured by the drop in potential along resistance 39 which is included in the series filament heating circuit of tubes 23 and 37. This potential is preferably such as to cause the tube to operate on a straight portion of its characteristic curve.

To operate the harmonic generating system for testing purposes, the switch 17 is thrown to the dotted position and key 35 is depressed. By these operations, the harmonic generator is substituted for the source of signals 10 and the circuit of transformer winding 36 is opened. The effect of opening the circuit of winding 36 is to increase the impedance of winding 25 in the input circuit of tube 23, so that waves of sufficient voltage may be applied to the tube control electrode, by waves in the output circuit flowing through winding 27, to cause oscillations to be produced. When key 35 is closed, the impedance of the circuit, including winding 36, which is low, is reflected in the circuit including winding 25. On account of the low impedance of the input circuit only a small voltage can be impressed thereon by waves in the output circuit and hence oscillations cannot be generated.

Tube 23 has its control electrode supplied with an average potential by battery 26, such that it operates on a portion of its characteristic curve at which distortion takes place as already stated. Accordingly, in the output circuit of the tube there will be produced waves of a plurality of frequencies. Resonant circuit 28 is tuned to a desired frequecy, which is present in the output circuit, and by offering high impedance to waves of this frequency, causes them to be supplied to the input circuit of tube 37 through the coupling condenser 40 and resonant circuit 38, which is likewise tuned to the same frequency as the circuit 28. Waves of the fundamental frequency, generated by oscillator 21, are supplied to the input circuit of tube 37, together with waves selected by resonant circuit 28, when key 45 is actuated.

By this operation, the transformer winding 46, shunted by adjustable resistance 47, is connected, in series with resonant circuit 38, in the input circuit of tube 37. By adjusting resistance 47, the amplitude of the fundamental waves, supplied to this input circuit, may be adjusted to any desired value.

Resonant circuits 28 and 38 are preferably tuned to as to select a wave having twice the frequency of the fundamental waves, transmitted through winding 46 to the input circuit of tube 37. Both the fundamental and harmonic waves, in this input circuit, are amplified by the tube 37 and supplied to the modulator 12 to modulate the carrier waves supplied from source 11. The modulated waves are then transmitted through the filter 13, amplifier 14, resonant circuit 15 and antenna 16.

The radio receiving system shown in Fig. 2 includes a carrier wave oscillator 50 and an antenna 51 coupled to the input circuit of a detector 52, the output circuit of which is coupled to amplifiers 53 and 54, arranged in tandem. Amplifier 54 has in its output circuit an indicating device, represented by a telephone receiver 55. The radio receiving system, here shown, represents any well known detecting and amplifying system, wherein a local oscillation generator is provided, for supplying waves of carrier frequency to reenforce received carrier waves.

The detector 52 may comprise any well known circuit arrangement, but is here shown including in its input circuit, a grid leak resistance 56 shunted by a blocking condenser 57. the two being in series with resonant circuit 58, which is coupled to the antenna circuit by the transformer 59. The oscillation generator 50 includes a space discharge tube 60 having an input circuit connected to its control electrode and cathode which includes polarizing battery 61 and adjustable inductance 62. The output circuit of the tube is connected to the anode and cathode and includes space current battery 63 in series with the primary winding of transformer 64. A coupling, between input and output circuits of tube 60, is afforded by an adjustable condenser 65, by which the frequency of waves generated in the system may be controlled.

For the purpose of explaining the method of operation of the system illustrated in Figs. 1 and 2, it may be assumed, for example, that the harmonic generator 21 produces a fundamental wave having a frequency of 1,000 cycles per second together with harmonics and the tuned circuits 28 and 38 are designed to select a harmonic wave having a frequency of 2,000 cycles per second. The carrier waves supplied by the source 11 may be of any desired frequency preferably sufficiently high to be efficiently radiated from the antenna 16. These waves may be, for example, of a frequency of 100,000 cycles per second. These waves, as well as one side band, may be suppressed in filter 13. The modulated carrier waves transmitted from antenna 16 are received by antenna 51 and supplied to the input circuit of detector 52 together with waves from the oscillation generator 50. If the waves from generator 50 have a frequency of 100,000 cycles there will be produced in the output circuit of tube 52 waves resulting from demodulation which have a frequency of 2,000 cycles and 1,000 cycles per second respectively. In this case these waves are supplied through the amplifiers 53 and 54 without producing an observable effect upon the indicating device 55 other than a steady note of 1000 cycles with a 2000 cycle component. However, should the frequency of waves from the oscillator 50 vary so as to have a value of 100,200 cycles per second, for example, then the waves in the output circuit of detector 52, resulting from demodulation, will include waves having frequencies of 2,200 cycles per second and 1,200 cycles per second. These waves are transmitted through the amplifier 53.

During the testing operation this amplifier is overloaded by increasing the voltage of the locally supplied carrier, by adjusting the coupling of transformer 64. Distortion of the waves supplied thereto then takes place. There will thus be produced in its output circuit a harmonic of the waves of 1,200 cycles per second, which will have a frequency of 2,400 cycles per second. The waves of this later frequency, together with waves having a frequency of 2,200 cycles per second, are amplified in the space discharge tube system 54. These waves actuate the indicating device 55 by which the observer is informed of a deviation in the frequency of oscillator 50 from the desired value of 100,000 cycles per second. It has been found that in a system such as has been described a difference of one half cycle per second in the frequency of the oscillator 50 and of oscillator 11 may be observed.

The frequency of the oscillator 50 may be varied by adjusting condenser 65 until the receiver 55 produces a steady continuous note in place of a note recurring intermittently, indicating that the beat frequency has disappeared and that the local carrier frequency corresponds substantially to that of carrier waves at the sending station. If the frequency of the carrier waves at the sending station is known, the frequency of waves from the oscillator 50 is indicated and vice versa. The tone produced in the receiver 55 also indicates the degree of variation of the frequency of oscillator 50 relative to that of oscillator 11 at the transmitting station. An advantage of this method is that the frequency of the oscillator at the receiving station will be made to follow any change in the transmitted frequency when the receiver is adjusted.

The specific embodiment of the invention herein disclosed, which has been used for the purpose of explanation, represents only one of the many equivalent arrangements that will readily occur to the persons skilled in the art to which the invention may be applied, and hence the invention is only to be limited as indicated by the scope of the appended claims.

What is claimed is:

1. The method of frequency indication which comprises receiving waves of known frequency, modulating said known waves with waves of unknown frequency, distorting waves resulting from modulation to produce a beat frequency, and translating said beat frequency to produce an indication as to the relative frequency of the waves of known and unknown frequency.

2. The method of frequency indication which comprises modulating waves of known and unknown frequency, distorting the waves resulting from the modulation, and utilizing a component wave resulting from the distortion to produce an indication of the relation between the frequency of waves of unknown frequency and the frequency of said waves of known frequency.

3. The method of frequency indication which comprises modulating inaudible waves of known and unknown frequency, distorting the waves resulting from the modulation to produce an audible frequency wave, and causing said audible frequency wave to produce and audible sound as an indication that the frequency of said unknown waves is different from the frequency of said known frequency waves.

4. The method of frequency indication which comprises, combining inaudible waves of known and unknown frequency, varying the frequency of said waves of unknown frequency, causing said known frequency waves to modulate said unkown frequency waves, distorting the resultant waves produced by modulation, and causing a wave resulting from the distortion to indicate when the frequency of the adjusted waves is the same as the known frequency waves.

5. The method which comprises, transmitting a carrier wave of given frequency modulated by a plurality of waves, receiving said modulated wave, combining therewith waves of unknown frequency to produce resulting waves, distorting one of said resulting waves, and combining therewith the other of said resulting waves to produce an indication as to whether the frequency of said unknown waves corresponds to the carrier wave frequency.

6. In a radio transmission system, means for transmitting a carrier frequency wave modulated by two other waves, one having a frequency twice that of the other, a receiving system including an adjustable oscillator normally producing waves of said carrier frequency, a detector impressed with said modulated and local carrier frequency waves, a wave distorting amplifier for producing a hormonic wave of the lower frequency from said detector, a second detector for combining said harmonic waves with waves of the higher frequency from said first detector to produce beat frequency waves, and an indicating device operated by said waves of beat frequency.

7. In a signaling system a transmitting station and a receiving station, means at said transmitting station including a harmonic generator for transmitting to said receiving station a single side band produced by modulating a carrier wave with two different frequency waves, an oscillation generator at said receiving station, a demodulator supplied with said side band and waves from said generator, a distorting amplifier, and an indicating device for indicating the frequency of said generator.

8. In combination, a radio transmitting station comprising an antenna, a modulator, a source of carrier waves connected to said modulator, a plurality of sources of modulating waves connected also to said modulator, one of said latter sources comprising an oscillator and an amplifier in tandem, means coupling said amplifier and oscillator arranged to select a fundamental frequency and a hormonic frequency wave produced by said oscillator and a switch for connecting any one of said modulating sources to said modulator, and a receiving station including a source of carrier waves, and means controlled by said modulating waves for comparing the relative frequencies of said carrier waves.

9. In combination, a radio transmitting station comprising an antenna, a modulator coupled to said antenna, a source of carrier waves to be supplied to said modulator, a plurality of sources of modulating waves, one of said latter sources comprising means for supplying to said modulator one wave of given frequency and a second wave of double this frequency and switching means for connecting any one of said modulating sources to said modulator, and a receiving station including a source of carrier waves, and means controlled by said modulating waves for comparing the relative frequencies of said carrier waves.

10. In carrier current signaling, the method of synchronizing a current of carrier frequency generated locally at the receiving end for demodulation, which consists in demodulating the received current with said locally generated current and adjusting said locally generated current for frequency by comparison of two different harmonics in the demodulation product.

11. In carrier current signaling, the method of synchronizing a current of carrier frequency generated locally at the receiving end for demodulation, which consists in demodulating the received current with said locally generated current and deriving currents from two harmonics of the demodulation product that will be equal in frequency when, and only when, the said locally generated current is of the correct frequency, and making a compensating adjustment of said current for frequency by departure of said derived currents from the equality relation.

In witness whereof, I hereunto subscribe my name this 1st day of December A. D., 1924.

JOHN CECIL GABRIEL.